J. HERBRAND.
Running Gear for Vehicles.
No. 222,904.  Patented Dec. 23, 1879.
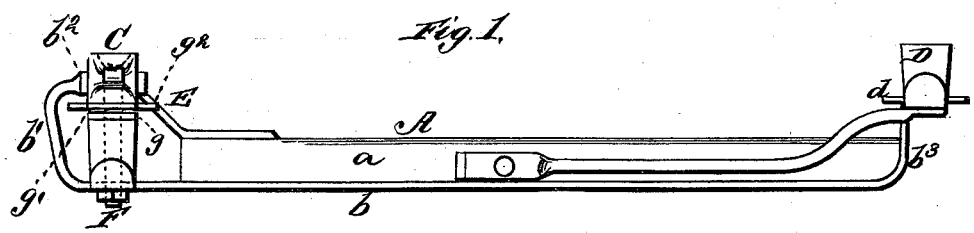
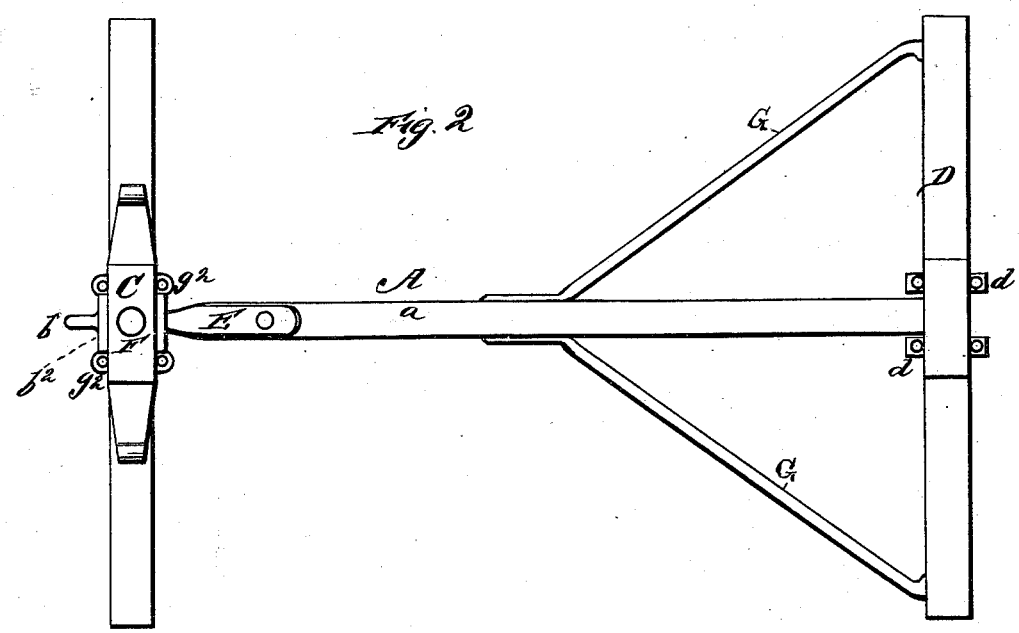
WITNESSES
Robert Everitt
Chas. A. Page
INVENTOR
Jacob Herbrand
Gilmore, Smith & Co,
ATTORNEYS

UNITED STATES PATENT OFFICE.

JACOB HERBRAND, OF FREMONT, ASSIGNOR OF ONE-HALF OF HIS RIGHT TO BYRON F. HUMES, OF ASHLAND, OHIO.

IMPROVEMENT IN RUNNING-GEARS FOR VEHICLES.

Specification forming part of Letters Patent No. 222,904, dated December 23, 1879; application filed November 1, 1879.

*To all whom it may concern:*

Be it known that I, JACOB HERBRAND, of Fremont, in the county of Sandusky and State of Ohio, have invented certain new and useful Improvements in Buggy and Carriage Gears; and I do hereby declare that the following is a full, clear, and exact description of the construction and operation of the same, reference being had to the annexed drawings, making a part of this specification, and to the letters and figures of reference marked thereon.

Figure 1 of the drawings is a side elevation of my wagon and carriage gear, and Fig. 2 is a plan view of the same.

My invention relates to buggy and carriage gears; and it consists in the improvements in the construction of the same, as hereinafter fully described, and particularly pointed out in the claims.

Referring by letter to the accompanying drawings, A designates the reach, which, as herein illustrated, is composed of a wooden bar, $a$, and a metal bar, $b$, both firmly fastened together by means of bolts or screws, or in other suitable manner.

The bar $b$ is formed with a front upwardly-curved end, $b'$, terminating in a plate, $b^2$, which is secured upon the front side of a block or bed-piece, C.

The rear end of the bar $b$ is curved upwardly, as at $b^3$, and terminates in a plate which is secured to the axle-bar D. This plate is formed with lugs or ears $d$, which have holes for the passage of the bolts or clips by means of which the springs are held down.

The bed-piece C, which is held by the curved end of the reach, as above described, is also held and braced by means of a bent bar or plate, E, which is secured to the reach, and also to the rear side of said bed-piece. The front axle is pivoted between the bar $b$ of the reach and the bed-piece C by a pivot-bolt, F, and upon the said axle is secured one of the plates, $g$, of the fifth-wheel. The upper plate, $g'$, of the fifth-wheel is formed with lugs or ears $g^2$, having holes for the bolts of the clips which are employed for the purpose of securing the front spring in place.

I have not considered it necessary to illustrate either the springs or the clips, it being understood that the front spring will be secured upon the block or bed-piece C, and the rear spring upon the rear axle-bar.

G designates the usual braces, which are secured to the reach and the rear axle-bar.

The above-described formation of the reach admits of the vehicle-body being hung lower than usual, so as to be more convenient for persons getting in or out of the same, and the arrangement of the plates with lugs or ears at the curved ends of the reach affords a strong, simple, and effective means for securing the springs in place by clips.

What I claim is—

1. The reach comprising the straight bar $a$ and metal bar $b$, with curved ends $b'$ and $b^3$, the block or bed-piece C, brace-bar E, and the fifth-wheel plates $g$ $g'$, all constructed and arranged substantially as set forth.

2. The front axle, with the plate $g$ of the fifth-wheel secured thereto, the bed-piece C, with the plate $g'$ of the fifth-wheel, having lugs or ears $g^2$, the brace-bar E, secured to the reach and to the block or bed-piece C, the metal bar $b$, with an upward curve, $b'$, and plate $b^2$, secured to the bed-piece C at its front side, and the curved end $b^3$ of bar $b$, secured to the rear axle and provided with a plate having lugs or ears $d$, all arranged substantially as shown and set forth.

In testimony that I claim the above, I have hereunto subscribed my name in the presence of two witnesses.

JACOB HERBRAND.

Witnesses:
  M. H. MANSFIELD,
  H. S. SEE.